(12) United States Patent  (10) Patent No.: US 8,861,808 B2
Kulcke et al.  (45) Date of Patent: Oct. 14, 2014

(54) METHOD AND DEVICE FOR RECORDING A FINGERPRINT, WITH AUTHENTICITY IDENTIFICATION

(75) Inventors: Axel Kulcke, Pepelow (DE); Clarissa Hengfoss, Hamburg (DE); Günther Mull, Hamburg (DE)

(73) Assignee: DERMALOG Identification Systems GmbH (DE)

( * ) Notice: Subject to any disclaimer, the term of this patent is extended or adjusted under 35 U.S.C. 154(b) by 230 days.

(21) Appl. No.: 13/593,254

(22) Filed: Aug. 23, 2012

(65) Prior Publication Data

US 2013/0051637 A1 Feb. 28, 2013

(30) Foreign Application Priority Data

Aug. 24, 2011 (EP) .................................... 11178705

(51) Int. Cl.
*G06K 9/00* (2006.01)

(52) U.S. Cl.
CPC .................................... *G06K 9/0012* (2013.01)
USPC ........... 382/124; 382/125; 382/126; 382/127; 356/71; 359/30

(58) Field of Classification Search
CPC .......... G06K 9/00046; G06K 9/00013; G06K 9/0012
USPC ........ 382/124, 125, 126, 127; 356/71; 359/30
See application file for complete search history.

(56) References Cited

U.S. PATENT DOCUMENTS

| 6,429,927 | B1 * | 8/2002 | Borza ............................. 356/71 |
| 2003/0025897 | A1 | 2/2003 | Iwai |
| 2005/0271258 | A1 | 12/2005 | Rowe |
| 2008/0239285 | A1 * | 10/2008 | Wang et al. ..................... 356/71 |
| 2011/0163163 | A1 | 7/2011 | Rowe |

FOREIGN PATENT DOCUMENTS

| EP | 1498837 A1 | 1/2005 |
| EP | 2120182 A1 | 11/2009 |
| EP | 2309422 A1 | 4/2011 |
| WO | WO-2006/082550 A1 | 8/2006 |

OTHER PUBLICATIONS

"European Application Serial No. 11178705.7, European Search Report mailed Feb. 24, 2012", 6 pgs.

Barden, S. C., et al., "Volume-Phase Holographic Gratings and the Efficiency of Three Simple Volume-Phase Holographic Gratings", *Publications of the Astronomical Society of the Pacific*, 112, (Jun. 2000), 809-820.

Espinoza, M., et al., "Risk Evaluatio for Spoofing Against a Sensor Supplied With Liveness Detection", *Forensic Science International*, 204, (2011), 162-168.

(Continued)

*Primary Examiner* — Mike Rahmjoo
(74) *Attorney, Agent, or Firm* — Schwegman Lundberg & Woessner, P.A.

(57) ABSTRACT

The disclosure relates to a method for recording a fingerprint, with authenticity identification, using a fingerprint recording device which is connected to a data processing instrument and has a prism body with a contact face, an illumination unit for illuminating a finger disposed on the contact face, and a first camera sensor for recording a fingerprint image.

20 Claims, 14 Drawing Sheets

(56) References Cited

OTHER PUBLICATIONS

Hengfoss, C., et al., "Dynamic liveness and forgeries detections of the finger surface on the basis of spectroscopy in the 400-1650 nm region", *Forensic Science International*, vol. 212, No. 1-3, (Jul. 2011), 61-68.

Pishva, D., "Spectroscopically Enhanced Method and System for Multi-Factor Biometric Authentication", *IEICE Trans. Inf. & Syst.*, vol. E91-D, No. 5, (May 2008), 1369-1379.

\* cited by examiner

METHOD AND DEVICE FOR RECORDING A FINGERPRINT, WITH AUTHENTICITY IDENTIFICATION

CROSS-REFERENCE TO RELATED APPLICATIONS

This application claims the benefit of priority, under 35 U.S.C. Section 119, to European Patent Application Serial No. 11178705.7, filed Aug. 24, 2011, which is in incorporated herein by reference in its entirety.

The present invention relates to a method and a device for recording a fingerprint, with authenticity identification, using a fingerprint recording device which is connected to a data processing instrument and has a prism with a contact face, an illumination unit for illuminating a finger disposed on the contact face and a first camera sensor, which are configured and arranged such that the camera sensor can record a fingerprint image either according to the principle of frustrated total internal reflection (FTIR) or according to the principle of total internal reflection (TIR).

By way of example, such a method has been disclosed in EP 2 120 182, which operates according to the FTIR principle in the dark field. Fingerprint recording units typically have a transparent prism body, on the upper surface of which the finger should be disposed for the recording. The prism body is typically a glass body. An illumination unit is arranged for illuminating the finger disposed on the prism body through said prism body. A two-dimensional, spatially sensitive sensor, i.e. a camera sensor, is arranged for recording light reflected by the disposed finger, which is cast back through the prism body. Such fingerprint recording units make use of the difference in the refractive indices, on the one hand, between the prism body and skin regions resting thereon and, on the other hand, between the prism body and air in the troughs situated between two adjacent epidermal ridges. The light incident on the boundary between prism body 2, as illustrated schematically in FIG. 1, and surrounding air or finger surface is scattered in some regions, specifically in the regions of the epidermal ridges, by diffuse scattering and is incident on an angled, mirrored side 4 of the prism body.

At those locations where no epidermal ridges are disposed, the light rays leave the prism in a substantially perpendicular fashion and are not incident on the mirrored side 4. As a result, the spaces between the epidermal ridges appear black in the reflection image; this method is therefore referred to as FTIR recording in the dark field. Light rays penetrating through the external side of the prism cannot adversely affect this method because these would have to be incident at such a shallow angle on the surface in order to be imaged on the camera sensor via the angled side 4 that the condition for total internal reflection would be satisfied and these could therefore not penetrate the prism. In principle, fingerprint recordings according to the FTIR principle are also possible in bright-field measurements if the illumination unit radiates-in light at a shallower angle than the critical angle and the camera sensor is directed at the contact face at the same angle on the opposite side of the prism body. Then total internal reflection occurs in the regions of the troughs between epidermal ridges and only diffuse scattering occurs in the region of the ridges, and so the epidermal ridges appear dark and the troughs situated therebetween appear bright in the fingerprint image recorded by the camera sensor.

A method that operates according to the TIR principle for recording the fingerprint image is known from e.g. US 2011/0163163 A1.

However, all that is decisive for the present invention is that a high-contrast fingerprint image is recorded which satisfies the requirements from a security-technical point of view in respect of resolution, contrast, etc. and not whether the measurement is implemented according to the TIR or FTIR principle or whether it is implemented in the bright field or in the dark field. In the description of the preferred exemplary embodiment of the present invention, the latter is applied to a fingerprint recording in the dark field according to the FTIR principle.

These days, the above-described image recording techniques are predominately implemented in optical single-finger or four-finger scanners. Digital camera systems have established themselves for a high image quality (high resolution, great contrast, lack of distortions). The contact face is provided by the upper side of a prism body, as described above. Such fingerprint recording methods are used for biometric identification of persons, for example in the access control to buildings or rooms or in the case of another verification of a person's authorization.

For the purpose of identifying persons, recording and evaluating fingerprint images has proven its worth in the field of biometric technology, specifically recording and evaluating the minutiae of the papillary ridges of fingerprints. The database systems required for this are generally referred to as AFIS systems (automatic fingerprint identification systems). The evaluation methods for the fingerprints by means of the minutiae are well known and are also applied in very large database systems (more than 10 million fingerprints stored). The evaluation is quick and reliable, even in the case of large amounts of data. There are a number of methods by means of which the fingerprint images recorded thus can then be evaluated and compared to available known data records for identification purposes, as described in EP 1 498 837 A1, for example.

In addition to the high-quality recording of the fingerprint image which should be used for identification purposes, it is of essential importance in security-relevant applications that the authenticity of the disposed finger is determined, i.e. it is essential to determine whether a real finger is disposed or whether this is an attempted deception (or forgery). The biometric identification on the basis of a fingerprint image at automated teller machines for identifying the authorized customer is mentioned as a future example for the stringent requirements in respect of reliably identifying the authenticity of fingerprint images. Here the case applies that this fingerprint identification requires authenticity identification because otherwise it would be feared that customers would be damaged or endangered by virtue of their fingerprint being used against their will. Furthermore, the authenticity identification must be complete within a very short timeframe. Times under 1 s are desirable in this case and times up to 5 s appear to be acceptable.

The types of forgery or deception in the case of fingerprint recording instruments can be divided into three groups:
(1) Reproduction of fingerprints on a polymer body or semi-flexible material body. The latter can have a stamp-form, the shape of a reproduced finger or an imitated hand (summarized below as "stamp polymer").
(2) Use of thin polymer film coverings over a real finger, wherein here use can also be made of transparent film coverings; a specific technique falling in this group is the so-called wood-glue method (summarized below as "film coverings").

(3) Use of a real finger, wherein the assumption can be made that the finger has been severed from the person or the person is no longer alive (summarized below as "corpse finger").

In the aforementioned publication EP 2 120 182 A1, a number of spectroscopic examinations are described which should contribute to authenticity identification or rejecting forgeries, for example the detection of spectral properties which are characteristic of oxygenated hemoglobin.

The aforementioned various forgeries to be disposed on a fingerprint scanner can supply a flawless fingerprint image; however, they differ in terms of their optical properties and so many forgeries can be identified and rejected. On the other hand, it was also found that deception is nevertheless possible in the case of many known fingerprint scanners (see e.g. "Risk Evaluation of Spoofing against a Sensor Supplied with Liveness Detection" by Marcela Espinoza and Christopher Champod, Forensic Science International 204 (2011), 162-168).

In the case of fingerprint recording methods operating according to the prior art, it may be acceptable that in a minority of cases even real fingerprints are classified as critical or a fake and a manual recheck takes place or the fingerprint is rejected as false even though a real finger was recorded. In the case of systems like automated teller machines such an error rate, albeit minor, is unacceptable.

It was found that film coverings in particular cannot yet be rejected with a sufficient reliability.

It is therefore an object of the present invention to specify a method and a device by means of which a fingerprint image can be recorded and which enable improved authenticity identification or rejection of fakes.

The method with the features of patent claim 1 and the device with the features of claim 10 serve for achieving this object. Advantageous embodiments of the invention are respectively listed in the dependent claims.

According to the present invention, use is made of a spectrometer which has running along a first direction a slit-shaped stop which only allows a slit-shaped region of the light reflected from the finger disposed on the contact face to pass through. Here, the spectrometer is designed such that it brings about spectral spread in a second direction which differs from the first direction, preferably in a second direction perpendicular to the first. In this manner it is possible to record, with a second camera sensor, a multiplicity of spectra corresponding to a multiplicity of successive pixels along the stop, to which spatial data along the first direction of the stop is assigned. In the recorded fingerprint image of the first camera sensor, an appropriate region is cut out, the latter corresponding to the region of the finger cut out by the stop of the spectrometer. In this cut-out region of the fingerprint image, epidermal ridges and troughs situated therebetween are identified and the spatial data thereof is determined along the first direction of the stop. The spatial data of the ridges and troughs from the fingerprint image are now used to combine all spectra which have spatial data corresponding to the ridges on the fingerprint image so as to form a single ridge spectrum and to combine the spectra whose spatial data corresponds to spatial data of troughs in the fingerprint image so as to form a single trough spectrum. The combined spectra are normalized to the same overall intensity and the normalized ridge spectrum is subtracted from the normalized trough spectrum in order to form a difference spectrum. Finally the difference spectrum is examined for features indicating the presence of covering materials foreign to the body and the authenticity of the fingerprint is rejected if these are present.

The present invention serves in particular for finding coverings over fingers, provided with a profile with ridges and troughs of a desired, artificial fingerprint. The method is based on the evaluation principle outlined below. In the case of a covering with an artificial fingerprint on it, the positions and spacings of epidermal ridges on the artificial fingerprint will generally have no relation to the positions and spacings of the real epidermal ridges of the finger situated therebelow. According to the present method, ridges and troughs and the spatial data thereof are now determined in the fingerprint image, i.e. the spatial data of ridges and troughs of the artificial fingerprint on the covering which is responsible for the fingerprint image. These ridge positions and trough positions are now used to accordingly divide the multiplicity of spectra into "ridge spectra" and "trough spectra". Since the positions of the ridges and troughs of the artificial fingerprint in the case of a finger with a covering with an artificial fingerprint are completely unrelated to the actual ridges and troughs of the real fingerprint situated therebehind, complete averaging is carried out over actual troughs and ridges during the combination to form a single "ridge spectrum" and a single "trough spectrum" and so no difference should still be identifiable when a difference is formed. In the case of a finger with a covering with a faked fingerprint, the spectra of ridges and troughs (in the faked fingerprint image) only differ in that in the region of the ridges of the fingerprint image the additional material of the epidermal ridges of the faked fingerprint is present, while a trough without the ridge material of the artificial fingerprint is situated between two ridges of the artificial fingerprint. If the difference spectrum is now formed from the ridge spectrum and the trough spectrum (which are defined by the ridges and troughs of the artificial fingerprint on the covering), the difference is caused precisely by the additional ridge material of the artificial fingerprint. Consequently, the difference spectrum contains precisely the spectral information relating to the ridge material of the artificial fingerprint of the covering. If the covering with the artificial fingerprint formed thereon for example consists of silicone, the difference spectrum substantially exhibits a silicone spectrum.

Since the artificial covering material must be elastic materials of polymer material in particular, characteristic properties of C—H—, O—H— and N—H-groups can be sought after in the difference spectrum and, should these be present, it is possible to conclude that a film covering is present and the authenticity of the fingerprint can be rejected.

In order to indentify materials foreign to the body, the finger disposed on the contact face is preferably illuminated in the NIR range of 800-1000 nm and a multiplicity of spectra are recorded in this wavelength range because a particularly good identification of materials foreign to the body is possible here.

Moreover, it is possible to record a multiplicity of spectra in the visible VIS range of 500-850 nm. By way of example, these spectra from the VIS range can be examined for the presence of hemoglobin and the degree of oxygenation thereof can be examined in respect of predetermined criteria and, if these are not satisfied, the authenticity of the fingerprint can be rejected.

The spectra from the NIR range can furthermore be examined in respect of the water and fat contents and the authenticity of the fingerprint can be rejected if these are situated outside of predetermined ranges. The multiplicity of the recorded spectra, together with their spatial dependence along the first direction of the stop, can also be used to determine the positions of ridges and troughs in the spectra. The spatial data of the ridges and troughs from the spectra can then be compared to the spatial data of the ridges and troughs from the fingerprint image and these can be examined in respect of correspondence. If a film covering is present, the ridges and troughs thereof will generally be completely uncorrelated to the real ridges and troughs below the covering, while there is complete correlation in the case of a real finger without covering, and so very good discrimination is possible between real fingers and fingers with a covering having an artificial fingerprint.

The spectra are preferably used in the form of the second derivative thereof. The second derivative represents the rate of change of the gradients of the spectra. It follows from this that these curves are independent of constant or linear absorption properties. Hence the curves are largely independent of instrument variations and scattering properties of the tissue. However, the significant chemistry-dependent absorption bands are maintained in a transformed form, and the chemical properties can be identified and evaluated much more significantly in the spectroscopic data.

According to a further aspect, the present invention provides a device for recording a fingerprint, with authenticity identification, having a fingerprint recording device, which is connected to a data processing instrument and has a prism body with a contact face, an illumination unit for illuminating a finger disposed on the contact face and a first camera sensor, which are configured and arranged such that the camera sensor can record a fingerprint image either according to the principle of frustrated total internal reflection (FTIR) or according to the principle of total internal reflection (TIR). Furthermore, provision is made for a spectrometer, which has a slit-shaped stop running along a first direction for cutting out a slit-shaped region of the light reflected by the finger disposed on the contact face. The spectrometer is furthermore designed to spread light passing through the slit-shaped stop spectrally in a second direction which differs from the first direction, preferably being perpendicular to the latter. This is how a multiplicity of spectra are formed, which correspond to successive pixels of the stop in a first direction and respectively represent the spectral spread of a pixel in the second direction. This two-dimensional spectral series is recorded by the second camera sensor. The data processing instrument connected to the second camera sensor is designed to store the multiplicity of spectra, respectively with assigned spatial data along the first direction of the stop. The data processing instrument is furthermore designed to cut out that region in the recorded fingerprint image which corresponds to the stop of the spectrometer, i.e. cutting-out in the fingerprint image data simulates the situation where a corresponding stop is also arranged in front of the first camera sensor, which stop only lets light pass from precisely the same strip-shaped skin region which also enters the spectrometer and is subsequently recorded by the second camera sensor. In this way it is possible to define spatial data along the first direction of the stop both in the spectra and also in the slit-shaped cut-out region of the fingerprint image, wherein this spatial data then relates to the same locations on the finger surface.

The data processing instrument is furthermore designed to identify epidermal ridges and troughs situated therebetween in the cut-out region of the fingerprint image and to determine the spatial data thereof along the first direction of the stop. The data processing instrument is furthermore designed to select from the multiplicity of spectra according to the spatial data thereof those that have spatial data corresponding to the spatial data of ridges in the fingerprint image and to combine these spectra so as to form a single ridge spectrum. Furthermore, those spectra whose spatial data correspond to spatial data of troughs in the fingerprint image are combined so as to form a single trough spectrum. The ridge spectrum and the trough spectrum are subsequently normalized to the same overall intensity in the data processing instrument and these normalized spectra are subtracted from one another so as to form a difference spectrum. Finally, the data processing instrument is designed to search for features indicating the presence of materials foreign to the body and, if the features of materials foreign to the body are satisfied, to reject the authenticity of the fingerprint.

The illumination unit is preferably arranged below the prism body for radiating light through the prism body from below and onto the finger disposed on the contact face. The spectrometer is arranged in such a way as to use its stop to pick up light which is reflected downward from the finger substantially perpendicularly to the contact face. In this application, "reflected" refers to all light which enters the prism body from the finger surface, i.e. also light which is cast back by scattering after entry into the finger—which is occasionally referred to as transflection or remission—in addition to the light reflected within the strict meaning of the word.

The spectrometer furthermore has a blazed grating, which is configured and arranged such that the dispersive spread of light passing through the stop takes place in a direction that differs from the longitudinal direction of the stop and preferably is perpendicular thereto, wherein the second camera sensor is configured and arranged such that it records on its camera sensor surface a diffraction image of the blazed grating along the first direction of the stop and the dispersive spectral spread of the light in a second direction that differs from the first.

Thus, the spectrometer is embodied as a two-dimensional spectrometer in the following fashion: it has a slit-shaped or slot-shaped stop for cutting-out a slit-shaped region of the light from the light source, reflected by and re-emerging from the finger disposed on the contact face. Furthermore, a grating is provided in the spectrometer, the former being configured and arranged such that the dispersive spread of the light caused by diffraction at the grating, which light passed through the stop, takes place in a second direction which differs from the longitudinal direction of the stop, preferably lying perpendicular thereto. Light diffracted by the grating is cast on the second camera sensor, which is configured and arranged such that it records on its camera sensor surface a diffraction image of the grating with the longitudinal direction of the stop in the first direction and the dispersive spectral spread of the light in a second direction that differs from the first. The second camera sensor is connected to the data processing instrument, which is furthermore designed to record the signals received by the second camera sensor as a multiplicity of spectra corresponding to a multiplicity of successive pixels along the longitudinal direction of the stop. That is to say the diffraction image of the stop for example lies on the camera sensor such that the longitudinal extent of the stop in the first direction corresponds to the Y-direction and the dispersive spread takes place in the X-direction perpendicular thereto. Then each line of the camera sensor corresponds to a pixel of the light passing through the stop, the spectrum of which light runs in the X-direction along a line of the camera sensor. Each line then forms an independently measured spectrum of a pixel along the first direction of the stop. The disposed position of the finger on the contact face and the position of the stop with respect thereto are preferably aligned such that the stop, with its first position, is perpendicular to the plurality of epidermal ridges and troughs, i.e. intersects the epidermal ridges such that there is a succession of epidermal ridges and troughs along the longitudinal direction of the stop.

In this case, the term stop should be understood to mean all optical means which cut out an elongate strip-shaped region of the light reflected by and emerging from the finger disposed on the contact face.

By way of example, the spectrometer can have three objectives. Here, all imaging optical units are referred to as objectives. Thus, for example, in this case this can also relate to e.g. achromatic or simple lenses. In practice, small, cost-effective and high-quality megapixel objectives in the S-mount standard are available, and these provide very good results. The first objective generates a normal two-dimensional image of the light originating from the finger disposed on the contact face (object). The slit-shaped stop is arranged in the image plane of the first objective. By way of example, the slit-shaped stop allows passage of a 20 μm wide strip from the image. The second objective images the slit-shaped stop at infinity. Situated downstream of the second objective there is the grating, which brings about dispersive splitting of the light, for example in a direction perpendicular to the longitudinal extent of the slit-shaped stop. The last objective now changes the image back again from infinity to the real image, the latter however now being spectrally spread as a result of the interposed grating. In a preferred embodiment, the grating of the spectrometer is a blazed transmission grating, which is optimized to emit the dispersed light in a concentrated manner in a predetermined angular range for a given wavelength range. Conventional gratings are disadvantageous in that the light of a specific wavelength is mainly distributed to the zero-th order and the rest is distributed in higher orders, which harbors a loss of brightness and hence sensitivity in each individual order.

This disadvantage is overcome by the so-called blazed gratings. Blazed gratings are optimized to diffract the light only in a specific direction and hence, in the case of a given wavelength, mainly to a specific order. As a result, a camera sensor can be positioned in the optimized angular range and only needs to cover a relatively small solid-angle range there. The first blazed gratings for example included reflection gratings with asymmetric saw-tooth-shaped surface designs, with the saw-tooth flanks being respectively aligned as individual mirrors such that the light was reflected in the direction of the desired diffraction order. Later, holographic gratings were also developed, which have the same effect as the blazed gratings described first. Further types of blazed gratings include the later-developed so-called VPH gratings (volume phase holographic gratings). VPH gratings are transmission gratings, in which a transparent transmission grating is enclosed between two glass or polymer panes. A desired pattern of varying refractive index is generated in the transparent material, for example by holographic exposure and structure changes of the material caused thereby. An example of such a blazed grating is found in the article "Volume-phase holographic gratings and the efficiency of three simple volume-phase holographic gratings", Samuel C. Barden et al., Publications of the Astronomical Society of the Pacific, Vol. 112, pages 809-820, June 2000. Using such blazed gratings, it is possible to concentrate a high percentage of the diffracted light of the wavelength range of interest in a specific angular range. As a result, a large proportion of the diffraction spectrum can be captured by a relatively small camera sensor. Typical blazed gratings can readily be used to concentrate a high proportion of more than 60% of the diffraction intensity in a small predetermined angle range.

The illumination unit is preferably prepared for different illumination situations. For the purposes of recording the fingerprint, an illumination unit should ensure an areally homogeneous illumination and should preferably also be quickly switchable. The spectral range should typically lie in the range of 650 nm-850 nm and be rather narrow-band (FWHM of the LEDs is typically 30 nm) (narrow-band illumination generates a sharper image in the case of real objectives). By way of example, an LED illumination unit is an option under these conditions.

For the spatially resolving spectrometer, the illumination unit should couple light into the finger such that the following boundary conditions are met:

1. The light should leave the illumination unit with a large aperture angle so that a homogenously diffuse illumination of the finger surface disposed on the contact face is made possible and mirroring reflections are largely avoided.
2. The light should be distributed over the wavelength region to be analyzed in a spectrally homogeneous manner. Such an illumination can be implemented by means of halogen lamps (thermal emitters), by means of a combined illumination unit of different broad-band LEDs or OLEDs, or can be generated by means of an illumination unit with LEDs of a different wavelength, which are provided with a fluorescent dye or a mixture of a plurality of fluorescent dyes which generate a broad-band emission in the required spectral range of 500 nm-850 nm and 800 nm-1000 nm. The latter procedure is comparable to conventional white-light LEDs, in which a blue LED excites a fluorescent dye, which shines in a broad-band manner in the spectral range green-yellow-red (500 nm-650 nm) such that the superposition results in a substantially homogeneous spectral distribution.

The illumination for recording the fingerprint image and the illumination for measuring the spectrum can be activated at different times from one another, for example in quick succession.

In the following text, the invention will be described on the basis of an exemplary embodiment, found in the drawings, in which.

Figure 3:
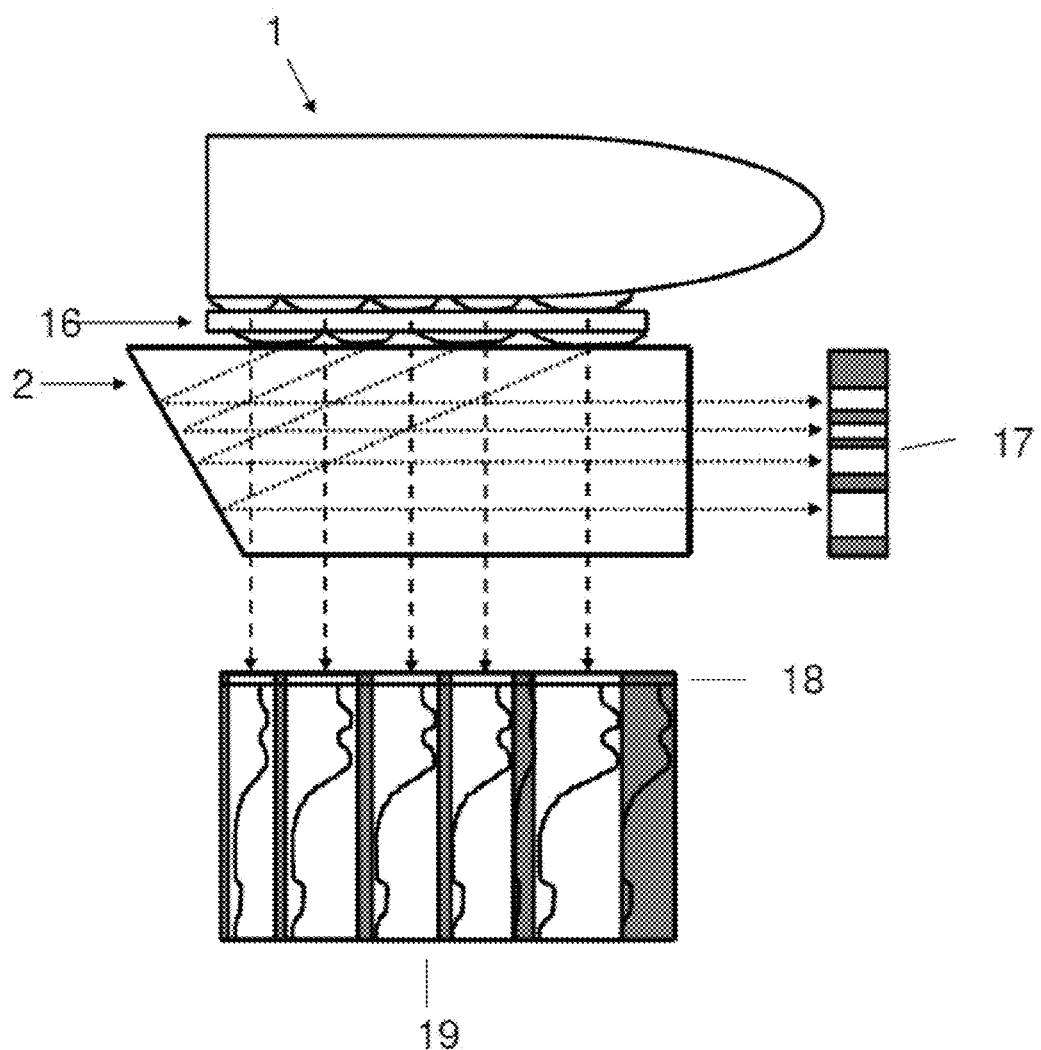
Figure 4:
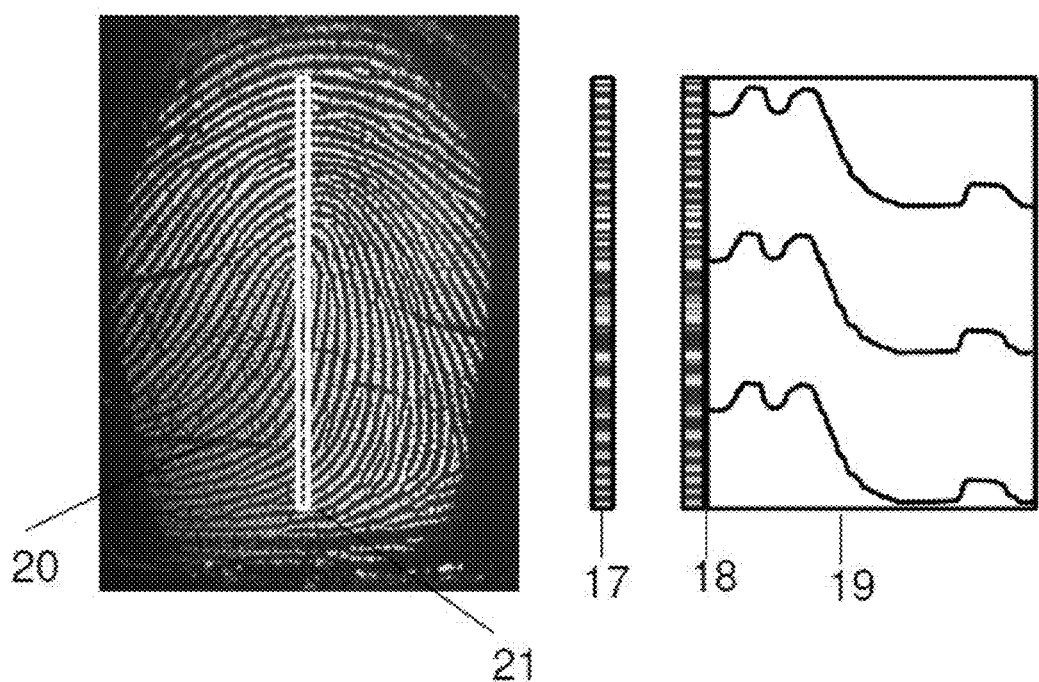
Figure 5:
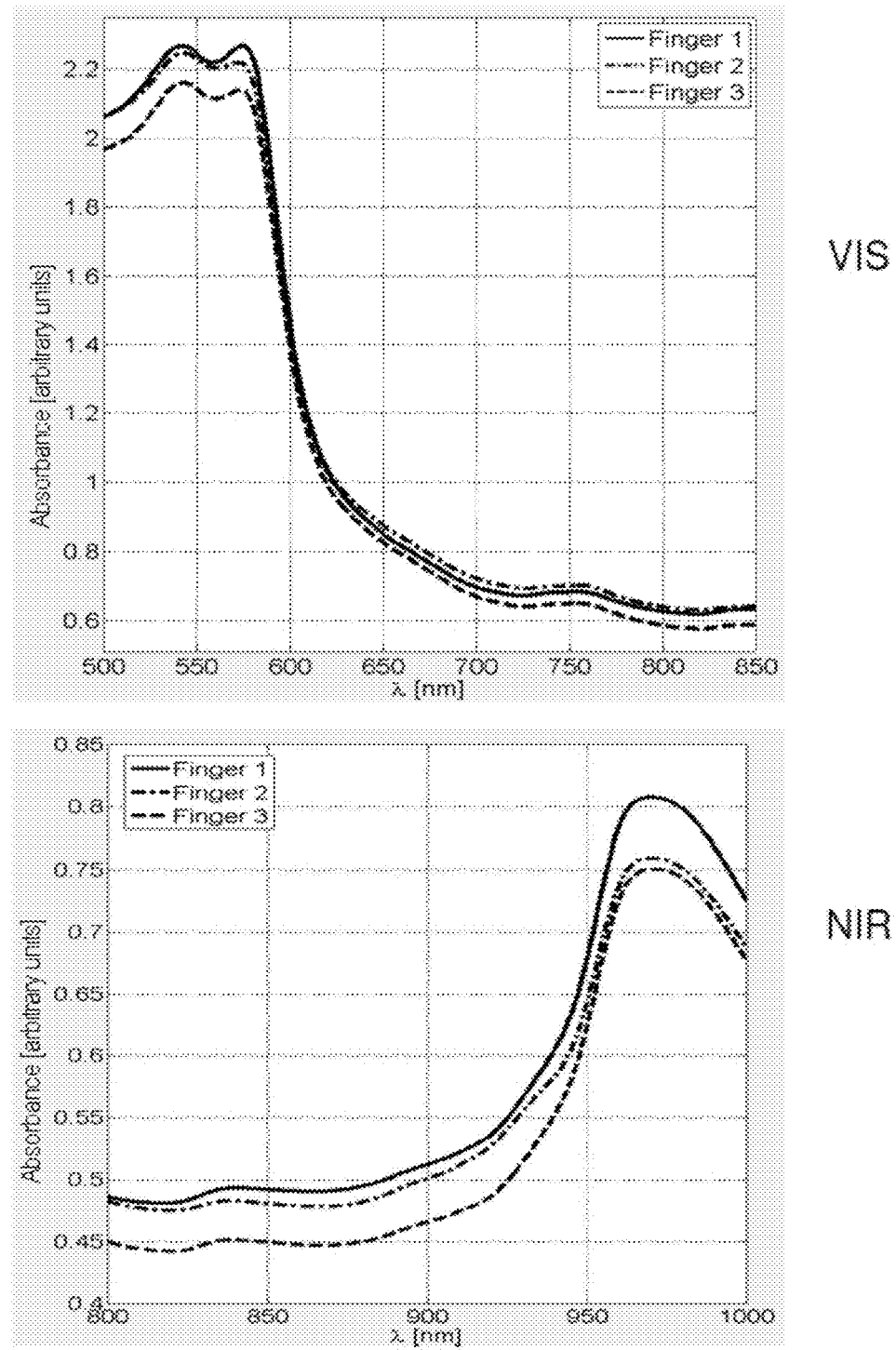
Figure 6:
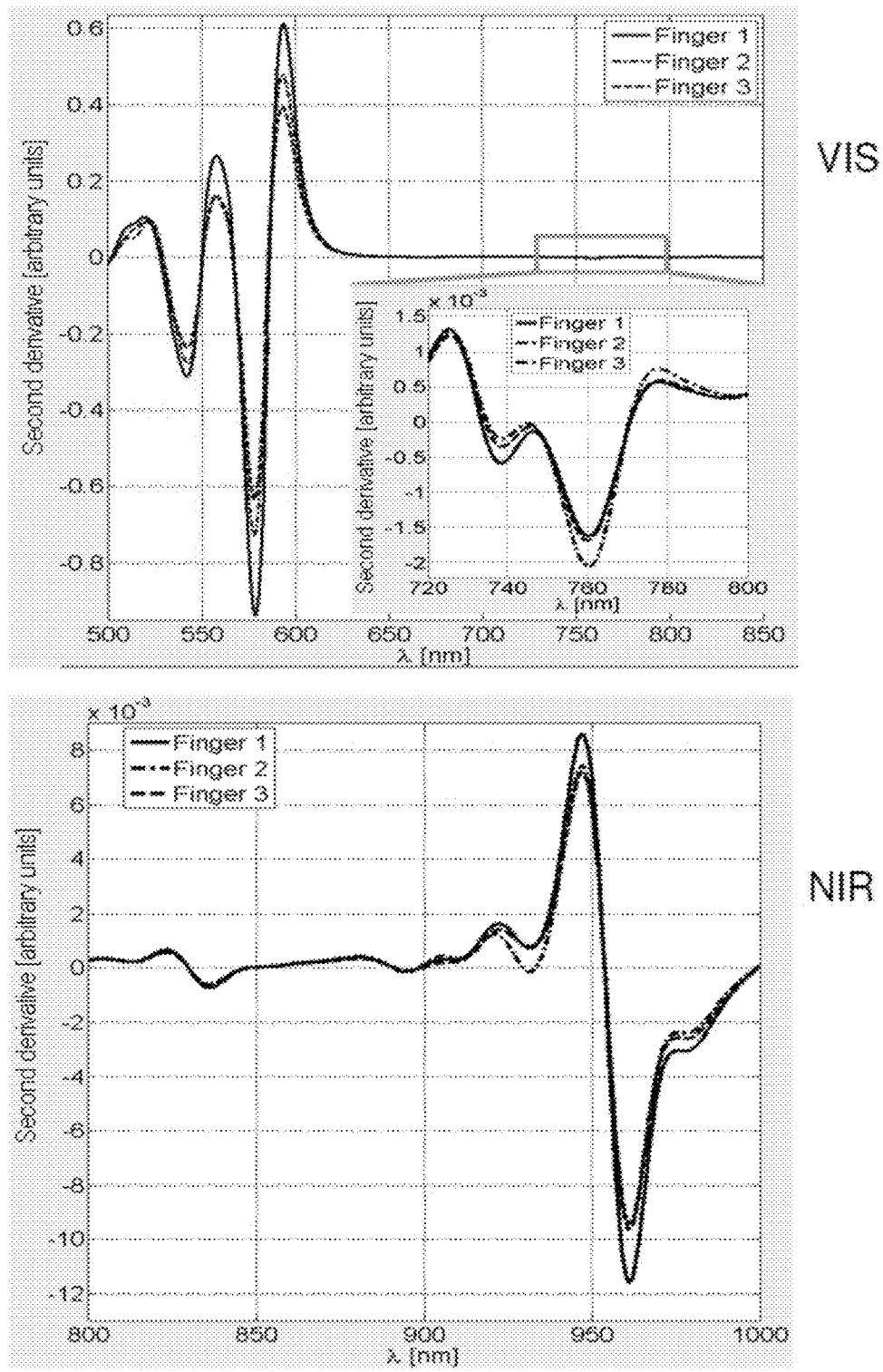
Figure 7:
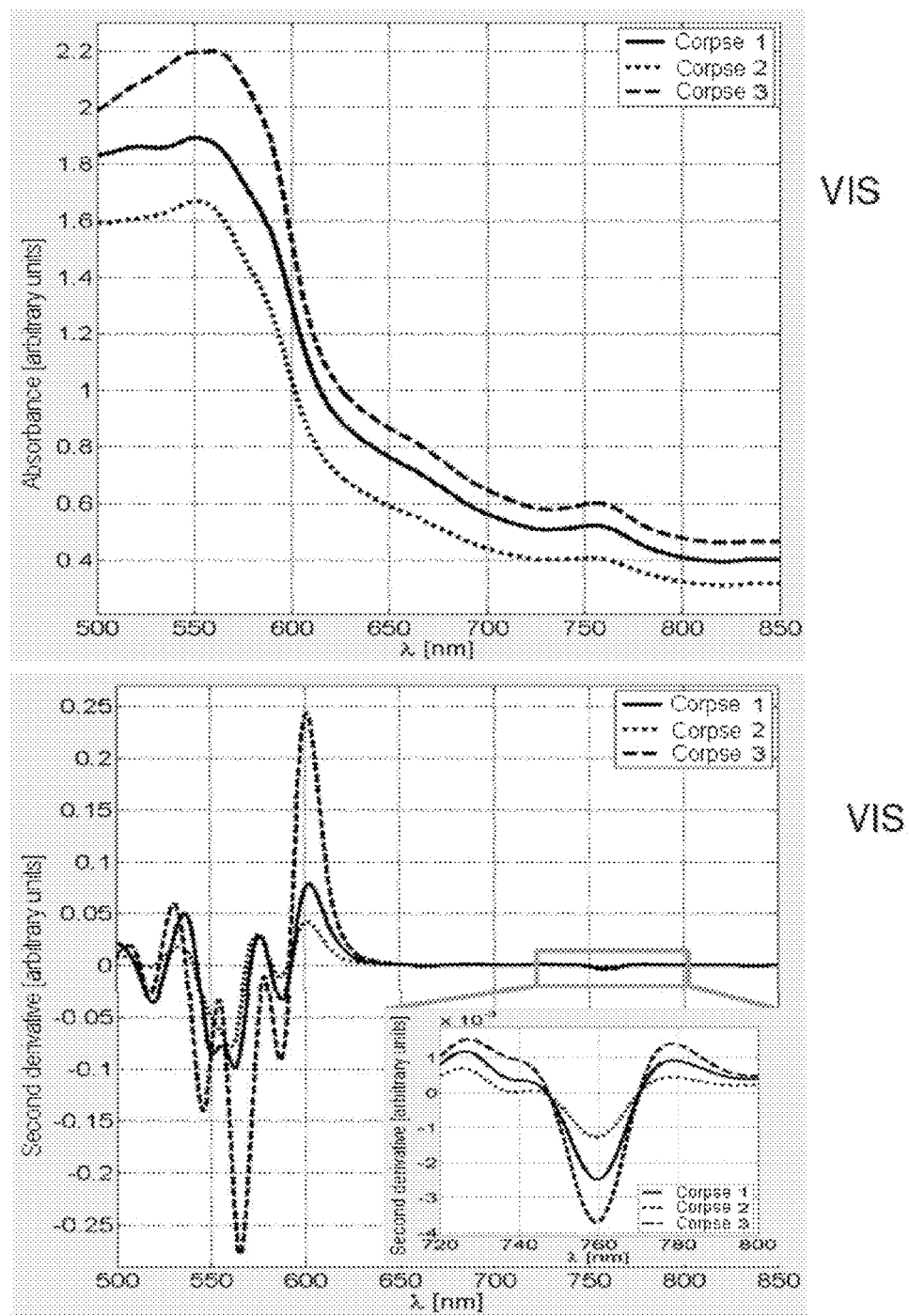
Figure 8:
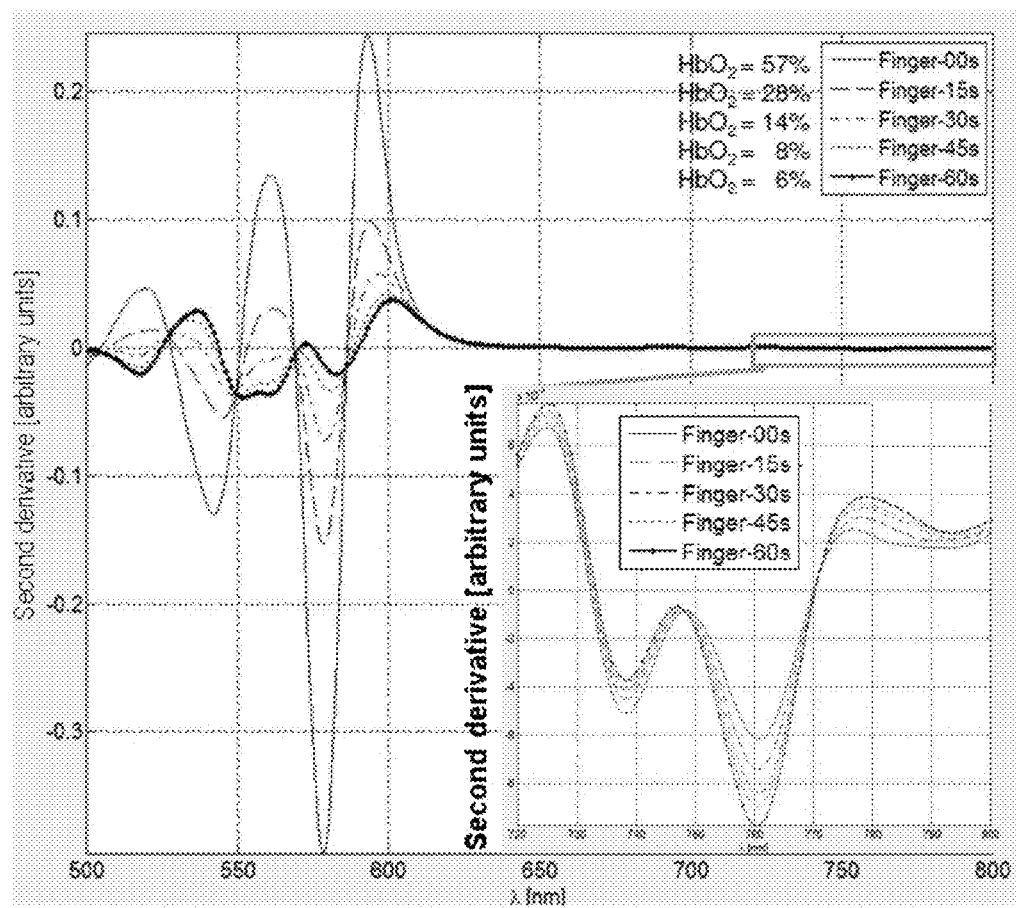
Figure 9:
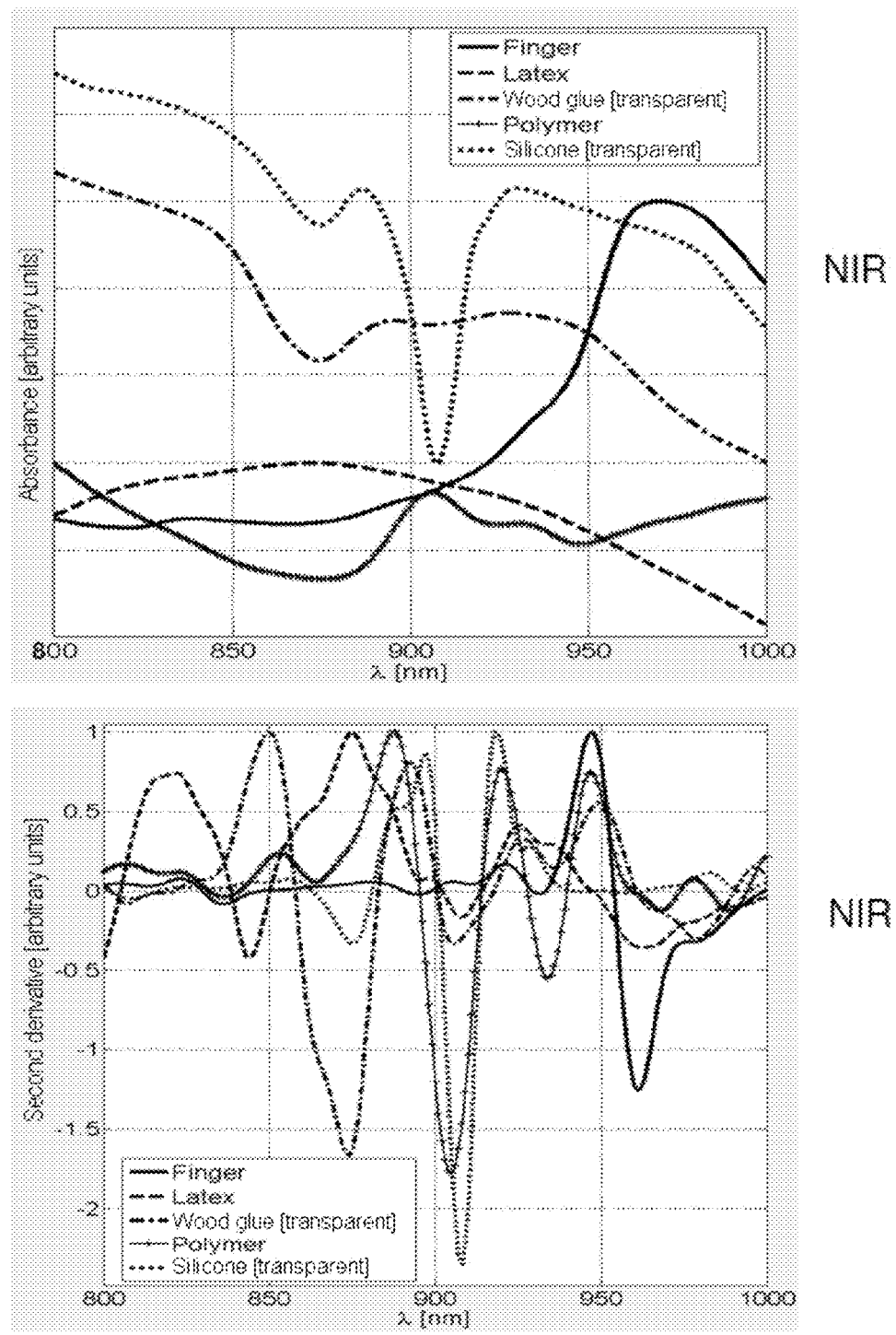
Figure 10:
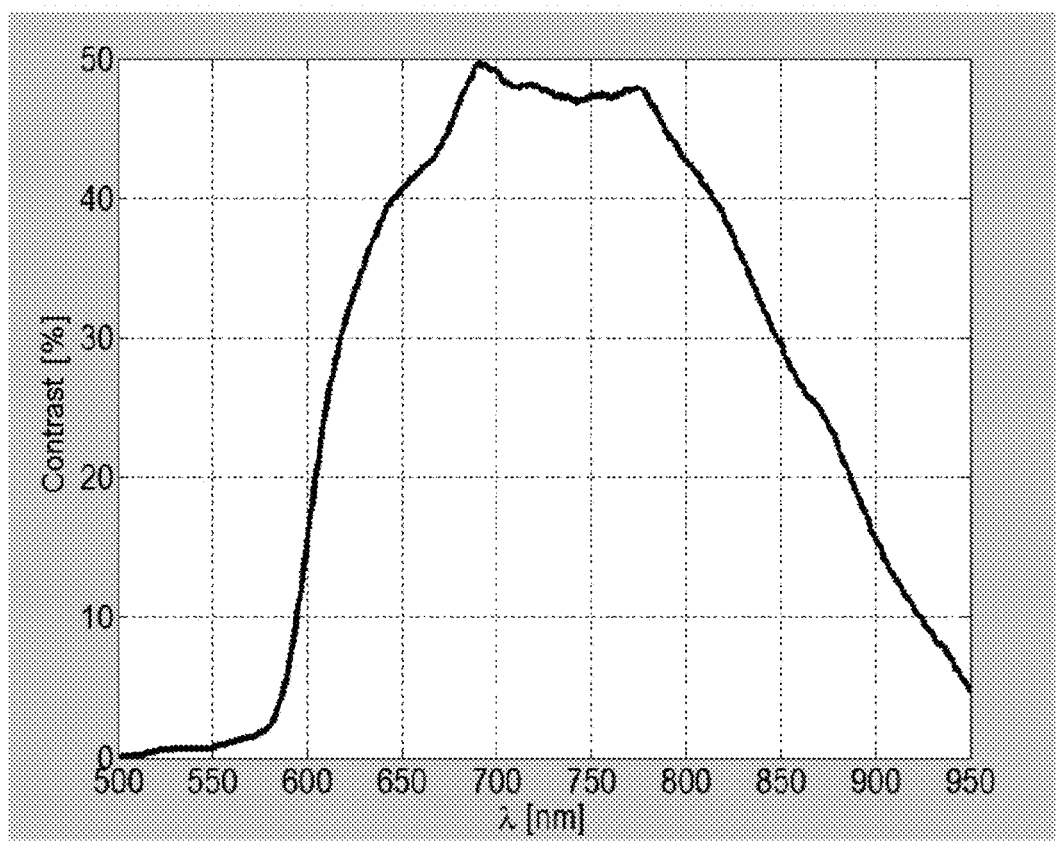
Figure 11:
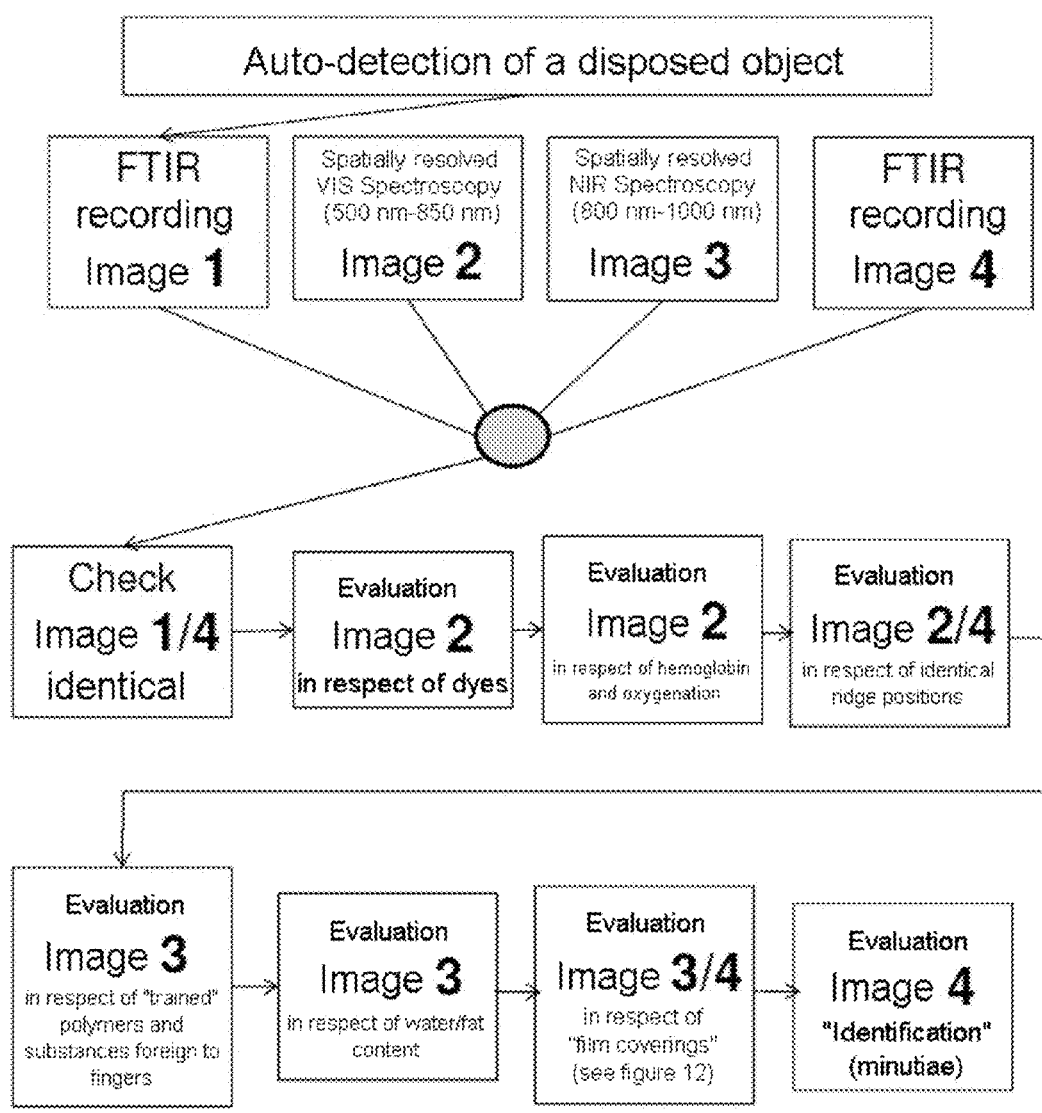
Figure 12:
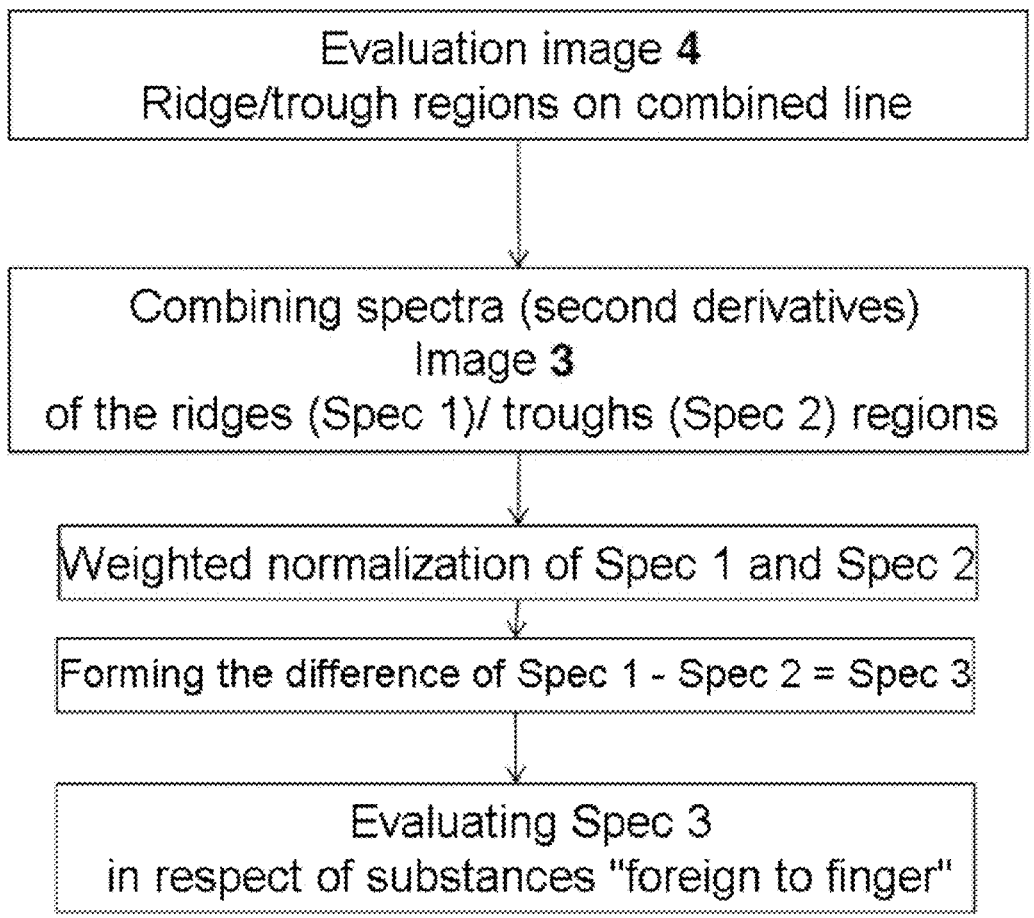
Figure 13:
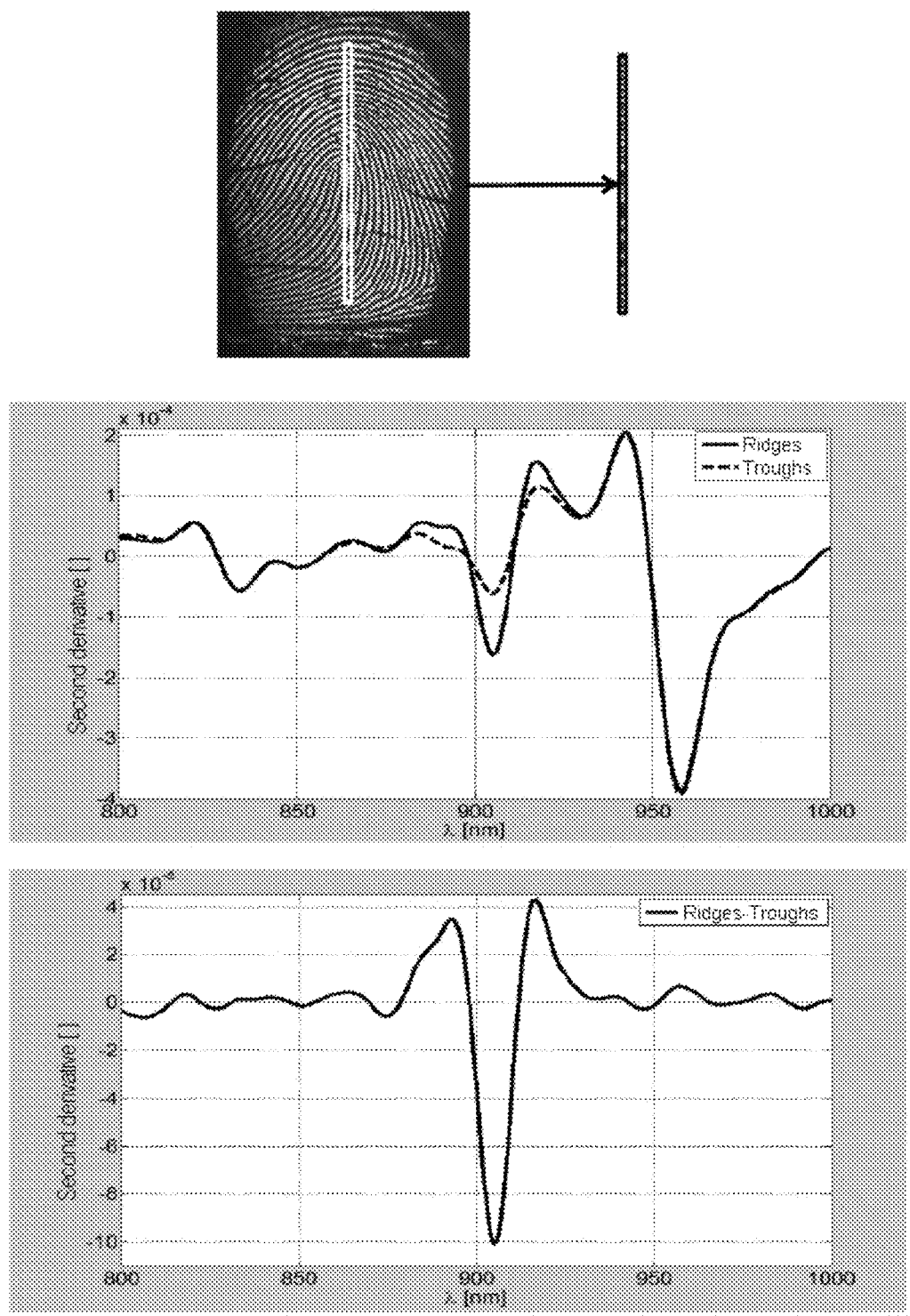
Figure 14:
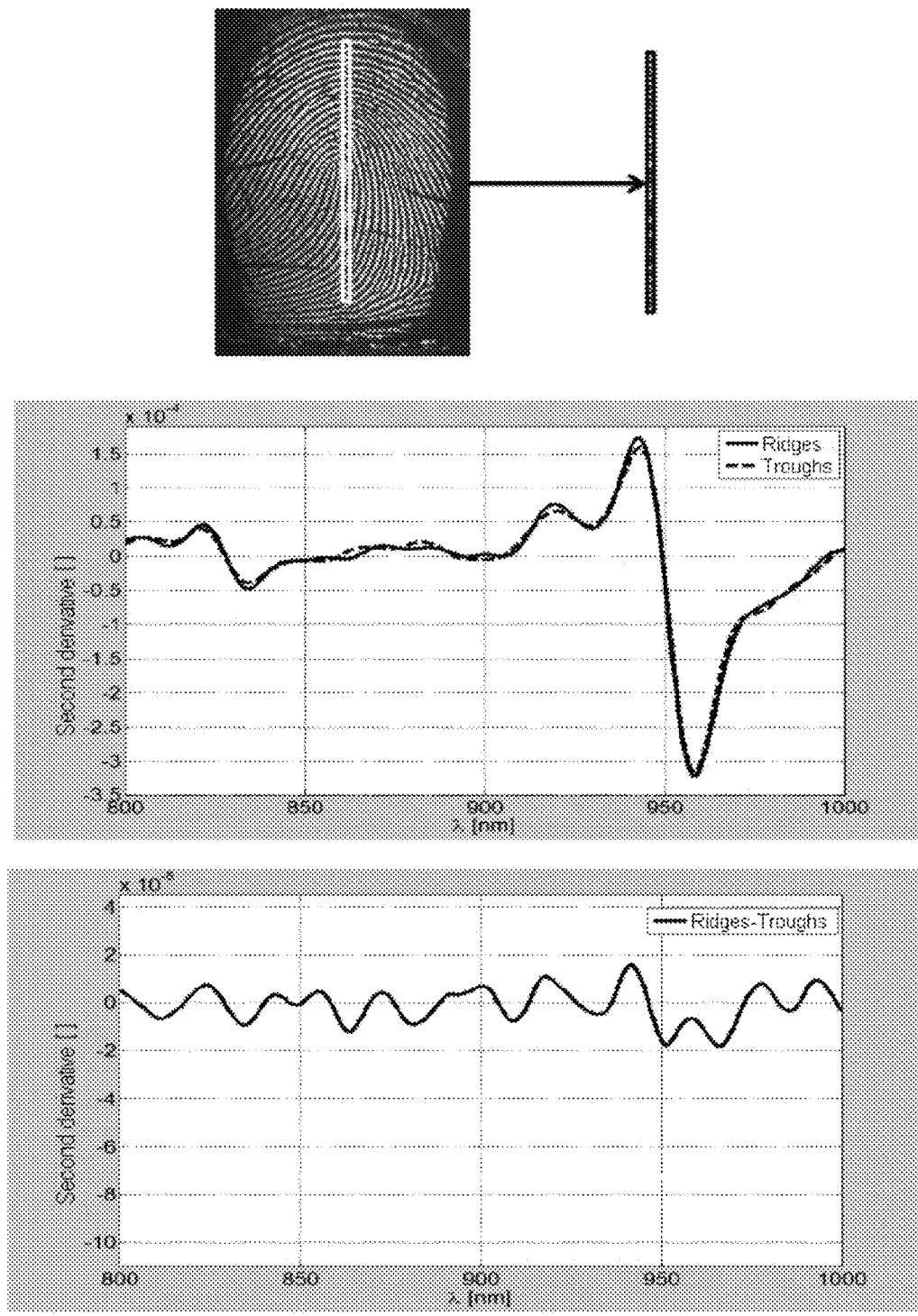

FIG. 3 schematically shows a fingerprint recording of a finger with a covering, in which the ridges and troughs of the covering shown in the fingerprint image and the ridges and troughs of the finger situated behind the covering shown in the spectra are indicated in schematic fashion;

FIG. 4 is an illustration for explaining the identification of film coverings over a "living" finger;

FIG. 5 shows the absorbance of different real fingers in the spectral range of 500-850 nm (top) and 800-1000 nm (bottom);

FIG. 6 shows the second derivatives of the spectra of the absorbance of different real and living fingers in the spectral range 500-850 nm (top) and 800-1000 nm (bottom);

FIG. 7 shows the absorbance (top) and the second derivatives (bottom) for corpse fingers in the spectral range of 500-850 nm;

FIG. 8 shows the second derivatives of the spectra of a tied-off finger for different times of being tied-off;

FIG. 9 shows exemplary spectra of "stamp polymers" and a real finger in the spectral range of 800 nm-1000 nm as absorbance (top) and as second derivatives (bottom);

FIG. 10 shows typical percentage brightness differences between ridges and troughs depending on the wavelength;

FIG. 11 shows a schematic flowchart for evaluating the fingerprint recordings and the spectral recordings for rejecting forgeries;

FIG. 12 shows a schematic flowchart for identifying film coverings with artificial fingerprints;

FIG. 13 shows a fingerprint image of a fingerprint with a covering with artificial fingerprint and the second derivatives of the associated ridge and trough spectra and the difference spectrum from this; and FIG. 14 shows a fingerprint image like in FIG. 13 of a real fingerprint without covering and the second derivatives of the associated ridge and trough spectra and the difference spectrum from this.

To the extent that the figures show spectra of the absorbance and spectra with the second derivatives of the absorbance, the latter are illustrated in arbitrary units.

Figure 1:
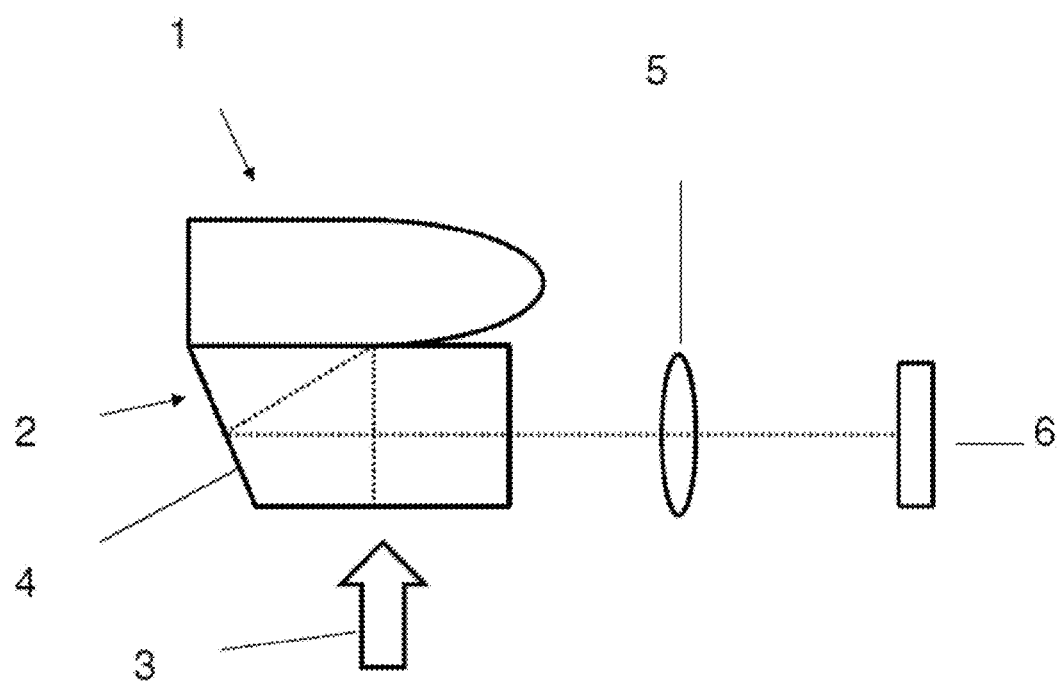
FIG. 1 shows a schematic illustration of the principle of a conventional fingerprint recording instrument.

FIG. 1 schematically illustrates the basic design of a conventional fingerprint recording instrument. The instrument has a transparent prism or contact body 2 with a planar upper support face, on which a finger 1 can be disposed. Light is radiated into the contact body from below from an illumination unit 3. As a result of the differences in refractive index between, first, the prism body and regions of the skin disposed thereon and, second, the prism body and air (in the interspaces situated between adjacent epidermal ridges), it is possible to image a fingerprint image. There is diffuse scattering in the regions where epidermal ridges are disposed, with diffusely scattered light being incident on the angled mirrored side wall 4 of the contact body 2 and, from there, being imaged on a camera sensor 6 via an objective 5. The camera sensor is a two-dimensional position-sensitive photosensor, preferably a high-resolution CMOS digital sensor. In the recorded FTIR fingerprint image, the epidermal ridges appear bright and the troughs between the epidermal ridges appear dark.

Figure 2:
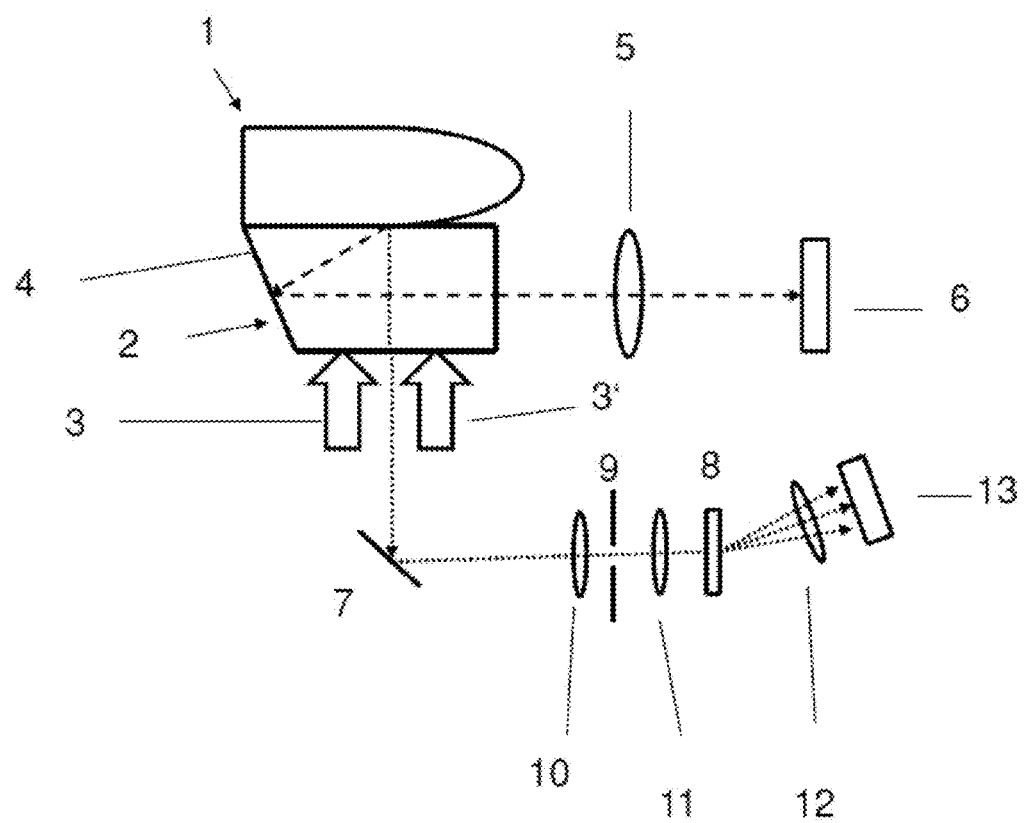
FIG. 2 shows a schematic illustration of the principle of a fingerprint recording instrument according to the invention.

FIG. 2 schematically shows the design of a fingerprint recording instrument according to the invention with an integrated spatially-resolving spectrometer unit. The illumination unit 3, 3' is provided such that it additionally generates broad-band light including the wavelength ranges between 500 nm and 850 nm and between 800 nm and 1000 nm. The light is likewise radiated through the contact body 2 onto the finger from below, in any case in such a fashion that no or only a small proportion of light directly reflected (specularly reflected) by the skin surface reaches the spectrometer. As a result of diffuse reflection and transflection in the tissue, the light is emitted from the finger through the contact surface and through the contact body 2 in the direction of the spectrometer. In the process, it can for example be directed in the direction of the input objective 10 of the spatially resolved spectrometer unit by means of a deflection mirror 7. The slit- or slot-shaped stop 9 of the spectrometer is arranged in the image plane of the objective. In the design illustrated in FIG. 2, the stop 9 would lie below the contact body, with its longitudinal direction perpendicular to the plane of the figure. The strip of the light emerging from the finger and imaged by a first objective 10, which is cut-out by the stop 9, is cast onto a grating 8 via a second objective 11. This grating is configured and arranged such that the dispersive wavelength-dependent spread of the diffracted light takes place in a direction which differs from and preferably is perpendicular to the longitudinal direction of the stop. In the illustration of FIG. 2, this means that the longitudinal extent of the stop is perpendicular to the plane of the figure, while the dispersive spread of the light takes place in the plane of the figure. A further objective 12 is then used to cast the diffraction image of the stop on the second camera sensor 13. On the sensor surface, the diffraction image of the stop then runs along the longitudinal extent of the stop in a first direction (perpendicular to the plane of the figure in the illustrated example) and the dispersive spread of the diffraction image runs along a second direction, which in this case is perpendicular to the first (in the plane of the figure). The camera sensor 13 is preferably a two-dimensional CMOS digital camera sensor. The latter affords the possibility of simultaneously recording up to 2000 spectra (one spectrum per line) with a bit depth of up to 12 bits using a single image recording. As a result, each of the spectra corresponds to the spectrum of a pixel along the stop, i.e. one can imagine the slit-shaped stop to be subdivided into 2000 pixels, wherein the light from each of these pixels is then imaged on one line of the camera sensor as a result of the grating. The camera sensor can record the image in approximately 20 milliseconds.

FIG. 3 shows a schematic illustration of an exemplary embodiment, in which a finger 1 with a covering 16 with a faked fingerprint has been disposed on the contact face. Here, the finger 1 can represent a real living finger, a corpse finger or an artificial finger (stamp polymer). Between the finger 1 and the contact face of the glass body there is a thin film as covering 16 with the faked fingerprint. This film in turn can be transparent, non-transparent, colored or milky. Furthermore, it can contain water or not, and the film will, with very high probability, contain organic-chemical substances which, first, generate an infrared absorption spectrum and, second, do not occur in the finger in comparable concentrations. The section of the fingerprint image corresponding to the stop is illustrated in detail 17. In the case where 16 constitutes a transparent covering, the faked ridges of the covering 16 are visible in the fingerprint image. By contrast, the spectrometer unit is only sensitive to the ridges and troughs of the finger 1, which are situated behind the covering 16 and also generate a contrast relief on the section plane as a result of the different tissues and perfusion compositions in ridges and troughs. Since it is not only an intensity value 18 that exists for each spatial point along the stop but rather a full VIS-NIR spectrum 19, the analysis of the finger 1 situated behind the covering can additionally be carried out for every spatial point.

In FIG. 4, a real 500 ppi FTIR fingerprint image 20 from a fingerprint scanner is illustrated as an example. By spatial calibration of the fingerprint recording unit with the spatially resolved spectrometer unit the position of the strip-shaped region 21 is related to the position of the stop such that the strip-shaped region 21 of the fingerprint image originates from the same finger-surface region as the light entering the spectrometer unit through the stop 9. As a result of this, the strip-shaped region 21 of the finger can be recorded by both optical units, specifically once as strip 21 from the FTIR fingerprint image, the intensity distribution of which is denoted by 17, and secondly as intensity distribution 18 of the spectrometer recording spatially resolved along the stop. Since a full VIS-NIR spectrum exists for each spatial point in 18, a ridge evaluation according to the physiological properties of the ridges can be carried out in an optimized manner in this case. In the case of a real living finger the assumption can be made that the evaluations and analyses deliver an identical result, i.e. in particular that the pattern of ridges and troughs corresponds. In the case of a transparent covering ("film covering") 16 lying therebelow, the assumption can be made that there are deviating results.

The following images should be used to explain how the different spectroscopic VIS-NIR evaluations are made possible.

FIG. 5 illustrates three typical spectra of fingers, as absorbance, in the two spectral ranges to be examined. Here, the first spectral range from 500 nm to 850 nm illustrated at the top mainly serves for the physiological evaluation of the hemoglobin derivatives and the identification of deviating visible pigments (colors) of optional fakes, while the lower illustration in the spectral range of 800 nm to 1000 nm serves to evaluate optional organic-chemical substances and the water content of the disposed "finger" 1.

In FIG. 6, the same spectra are illustrated as in FIG. 5, wherein the second derivatives of the curves of the absorbance are illustrated in this case. The second derivative represents the rate of change of the gradients of the spectra. From this, it follows that these curves are independent of constant or linear absorption properties. Hence the curves are to the largest possible extent independent of instrument variations and scattering properties of the tissue. However, the significant chemistry-dependent absorption bands are maintained in the second derivative in a transformed form, and so the chemical properties can be identified and evaluated much more significantly in the spectroscopic data.

At the top of FIG. 6, in the spectral range between 500 nm and 850 nm, the double bands at 578 nm and 546 nm are very clearly visible; these can be traced back to the oxygenated hemoglobin (HbO2) in the finger. The bands at 760 nm, which are weaker in terms of intensity, are caused by the deoxygenated hemoglobin (HHb). The spectrum in the range between 800 nm and 1000 nm is dominated by water in a real finger. Here, two combination bands of water can be identified in this spectral range at 830 nm and 960 nm. The spectrum is furthermore influenced by fat content (930 nm bands) and further organic substances, which are contained in the finger in lower variable concentrations.

FIG. 7 illustrates the finger spectra of corpse fingers as absorbance and the second derivatives thereof. It can clearly be identified that the spectral properties of the fingers significantly differ from living fingers. The spectra of the corpses are determined by the reduced hemoglobin (HHb) as a result of the lack of oxygenation of the blood.

FIG. 8 illustrates a demonstrative example for the deoxygenation of a finger. Here, a finger was cut off from the blood supply for a short period of time by means of a rubber band and the degree of oxygenation was determined before the cut off and after different time intervals during the cut off.

Since the spectral absorbance of the hemoglobin derivatives is scientifically determined with great accuracy (e.g. Zijlstra W., Buursma A., van Assendelft O. (2000). "Visible and near infrared absorption spectra of human and animal hemoglobin", Utrecht: VSP), it is very easy to determine the degree of oxygenation of the hemoglobin in the finger from the spectrum. From this in turn it is possible to derive a clear criterion for a living finger because arterial blood generally has a degree of oxygenation of greater than 90% and the mixed blood in the finger tip (arterial+venous+tissue) must have an oxygenation of greater than 50%. Higher values are common in a healthy, well-perfused finger.

FIG. 9 illustrates the absorbance and the second derivative of different "stamp polymers" and a real finger in the spectral range of 800 nm to 1000 nm. The "stamp polymers" are dominated by the characteristic absorption bands of the polymers (organic-chemical functional groups). Said absorption bands are characteristically very different from those of the substances present in a real finger. The NIR spectrum between 800 nm and 1000 nm of the real finger is determined here by the bands of water and fat. Further substances such as proteins and glucose play a subordinate role due to their lower concentration, but should be included in the tolerance range of the real finger.

FIG. 10 shows an evaluation which illustrates the typical brightness differences (absorbance) between ridges and troughs as a function of wavelength. It is possible to identify from this that the clearest contrast formation between ridges and troughs lies in the region of the lowest overall absorption between approximately 700 nm and 800 nm. This can be explained by the proportionally increased diffuse scattering in the tissue of the ridges.

FIG. 11 shows a possible evaluation scheme for identifying a fake. At the beginning of the sequence, it is necessary to ascertain by means of a detection mechanism when a finger has been stably disposed on the finger scanner. Low resolution images are typically recorded here with a high scanning rate and a simple pre-evaluation. After clearance, four images are generated in direct succession: image 1 is the current fingerprint image using FTIR technology. Image 2 is the spatially resolved VIS spectrum of the finger, recorded by the spatially resolving spectrometer, image 3 is the spatially resolved NIR spectrum (800 nm-1000 nm) and image 4 is a further fingerprint recording using FTIR technology.

After recording, a number of preprocessing steps are carried out in reality. These include rectification, white-normalization, etc.; however, these are well known to a person skilled in the art from the prior art and will not be explained in any more detail here.

In general, it suffices to record a single image when recording the spectral images 2 and 3. However, it should be noted that it can also be advantageous to record and combine a sequence of a plurality of images in order to improve the signal-to-noise ratio of the individual spectra.

It is first of all necessary to check that image 1 and 4 do not differ so that it is possible to ensure that the finger has not been displaced on the contact face during the recording sequence. In the case of a positive identification that the finger has not moved, the evaluation chain can be continued; in the case of a negative identification, a new recording sequence has to be started.

As a second evaluation step, the spatially resolved VIS spectrum is examined for "color" in the absorbance and the second derivative. From a spectroscopic point of view, the human finger spectrum is composed of the three substances melanin, oxygenated hemoglobin (HbO2) and deoxygenated hemoglobin (HHb). However, the proportional composition can vary over a large range. Using a chemometric evaluation it is possible to identify whether further dye pigments, differing therefrom, appear in the spectrum. In the case of a positive evaluation, i.e. no deviating dye pigments were found, it is possible to carry out the next examination. In the case of a negative evaluation the fingerprint is rejected.

In the following step, a threshold analysis of the overall hemoglobin signal is firstly carried out in the second derivative of the spatially combined VIS spectrum from image 2, and secondly a percentage ratio of the oxygenation of the hemoglobin is determined with the aid of the spectral absorbance from the spectra in the literature and a chemometric analysis. As can be seen from FIG. 7, the oxygenation decreases greatly after a very short time if there is a lack of arterial blood supply.

This method is used to identify "corpse fingers". The identification parameter and the deoxygenation behavior were already described on the basis of FIG. 7 and FIG. 8.

The spatially resolved VIS spectrum and the FTIR fingerprint image are used for the next evaluation step. Since both optical systems are spatially calibrated to one another, it is possible to extract from the FTIR fingerprint image a strip-shaped region which spatially corresponds to the finger region from which light passes through the stop and, in this respect, spatial points of the strip-shaped region 17 from the FTIR fingerprint image can be directly compared to the spatial points along the spectrometer line 18 (see FIG. 4).

If a transparent film covering 16 now lies on the contact face and a real finger 1 with a ridge structure that differs therefrom is situated behind it, there will be differences in illustration 17 from the FTIR fingerprint image and illustration 18 from the spectrometer even though both originate from the same strip-shaped skin surface region. In the case of a real finger, the spatial ridge positions must correspond over the whole recorded line of both illustrations. By contrast, if deviations are exhibited, the fingerprint is rejected.

The next evaluation step is carried out on the basis of image 3, the NIR spectra combined to form one spectrum. Here, the data is analyzed on the basis of the absorbance spectrum and the second derivative. This identification primarily serves to identify "stamp polymers" and hardly transparent or non-transparent coverings. In the process, there is a chemometric evaluation in respect of deviations from "usual fingers" and a check is furthermore carried out as to whether typically used polymers such as silicone, wood glue, Accutrans or similar materials can be identified directly by comparison with their known spectral properties. It is also possible that samples of typical known polymers are disposed on the contact face and measured by the spectrometer and the spectra thereof are stored in the data processing instrument such that the instrument "learns" the spectral signatures of known forgery materials. If such a polymer material is identified, the fingerprint is rejected.

In the following step, the same data from image 3 is evaluated one more time. Here, they are analyzed quantitatively in respect of the signals of water (960 nm) and fat (930 nm). The two substances are the dominant absorbers in this spectral range in the case of a living finger. Even though the values are subject to a significant variation over a cross section of the population, they can be distinguished very significantly from other technically implementable materials. Identification in this case is possible on the basis of thresholding and a deviation analysis, as a result of which "fingerprints" which have values outside of predetermined ranges of water and fat can be rejected.

The next and final step within the sequence of authenticity identification is a last, but therefor very significant, examination which is made possible precisely by the design described in the present application. For the evaluation, image 3 and image 4 are required as input data record. The procedure is illustrated separately in FIG. 12. An example in this respect is shown in FIG. 13.

The actual purpose of this analysis is to enable a very precise material analysis of the material generating the fingerprint to be carried out; this being independent of a very broad variation of the fingers disposed therebelow.

A fingerprint, whether real or faked, must have a height structure. Since the materials must furthermore have a certain amount of flexibility, the assumption can be made that a trough depth of at least 200 μm (comparable to real fingers) must be present so that a fingerprint image can be produced. The assumption can furthermore be made that this depth structure is not present on the finger-facing inner side when a thin (film-like) covering is used. Hence there must be a difference in the thickness of the covering material in the region of ridges compared to the troughs. Since, according to Beer-Lambert law, the strength of the absorption depends on the path length, the signal differences of an artificial fingerprint-generating covering material must therefore be uniquely distinguishable independently of the background.

To this end, the strip-shaped section is examined in the FTIR recording image 4 (or image 1) and divided into the following three regions: ridge, trough, transition (between ridge and trough and vice versa). Spatial data is in each case assigned to ridges and troughs (e.g. $x_1^{start}$, $x_1^{end}$ for start and end of the first ridge (if x is the coordinate in the first direction along the strip-shaped image region), $x_2^{start}$, $x_2^{end}$ for the second ridge, etc. and corresponding coordinate pairs for troughs).

Each spectrum from image 3 is likewise assigned a spatial coordinate x, which characterizes the position of that pixel along the first direction of the stop from which the respective spectrum originates. Now the spectra which, according to their spatial data, are situated in ridges, i.e. the x-coordinates of which lie along the stop in one of the ridge intervals $[x_1^{start}, x_1^{end}]$, $[x_2^{start}, x_2^{end}]$, ..., $[x_n^{start}, x_n^{end}]$ from the FTIR fingerprint image, are combined to form a single average ridge spectrum (Spec 1 in FIG. 12). Accordingly, all spectra which, according to their spatial coordinate x along the stop, lie in one of the trough intervals from the FTIR fingerprint image are combined to a single average trough spectrum.

The two mean-value spectra are now normalized because the overall intensities can vary as a result of different scattering properties. That is to say the trough spectrum and the ridge spectrum are made to have the same integral.

After normalization, the trough spectra are subtracted from the ridge spectra.

What remains in the case of a film-like covering is the material spectrum of the ridge material. This is a pure substance spectrum of the substance which makes up the ridges. This can vividly be clarified on the basis of FIG. 3: if one considers the vertical beams which run downward from the finger and the spectra of which are formed, it is possible to identify that, on average, they only differ by the artificial ridges at the bottom of the film covering 16 because there was complete averaging over all other structures along the x-coordinate (first direction of the stop) because the "real" ridges and troughs of the finger are completely uncorrelated along the x-direction to the ridges and troughs of the film covering 16. These ridges are therefore exhibited in the difference spectrum, which represents the spectrum of the ridge material of the covering 16.

Since typically 1500-2000 spectra are recorded by the described spectroscopy and these are summed to only 2 relevant classes and there is therefore a very high bit depth, even the smallest of differences can be identified very significantly. If these spectral differences now fit to known spectra of a possible artificial ridge material, it is possible to reject the fingerprint.

An example of the described checking procedure on the basis of a very thin transparent silicone covering is described with reference to FIG. 13. Here, the fingerprint image with the extracted strip-shaped region is shown at the top, which region corresponds to the finger region of the stop, from which light can pass into the spectrometer. The strip-shaped region is subdivided into intervals of "black", "gray" and "white", corresponding to "troughs", "transitions" and "ridges". Using these intervals, the spectra, to which of course a location x along the longitudinal direction of the stop is also assigned in each case, are divided into trough spectra and ridge spectra and the spectra from transitions are not considered any further. The trough spectra and ridge spectra are respectively combined to form a mean spectrum and are normalized to have the same integral, which mean spectra are illustrated in the upper one of the two graphs in FIG. 13. After forming the difference, the spectrum illustrated at the bottom of FIG. 13 then remains, which is a pure silicone spectrum of the ridge material of the covering. If any material foreign to the body is found in the difference spectrum on the basis of a known spectral characteristic, it is possible to unambiguously conclude that deception is being attempted and the fingerprint can be rejected.

Illustrated at the top of FIG. 14 is the fingerprint image of a "real" finger, the normalized ridge and trough spectra are illustrated below and the difference spectrum is illustrated right at the bottom. The difference spectrum exhibits no significant structures or signatures that could indicate a spectrum of a foreign material. The signal variation is significantly smaller than in the case of a covering being present and is more likely to be determined by noise. This means that although the spectra of the absorbance between ridges and troughs show differences in intensity, there are no differences in the second derivatives and so the difference spectrum of a real finger has no significant structures.

As illustrated in FIG. 11, it is now possible to carry out an evaluation of the minutiae on the basis of image 4 after this last examination step. Secured person identification can be undertaken on the basis of this evaluation.

If an evaluation is as a result identified as a "fake" within the sequential process, the sequential process is interrupted and the fingerprint evaluation is not unblocked. How the process continues in this case is not subject matter of the application and can be implemented in very different forms for different applications.

The invention claimed is:

1. A method for recording a fingerprint, with authenticity identification, comprising:

using a fingerprint recording device which is connected to a data processing instrument and has a prism body with a contact face, an illumination unit for illuminating a finger disposed on the contact face and a first camera sensor, which are configured and arranged such that the camera sensor can record a fingerprint image either according to the principle of frustrated total internal reflection (FTIR) or according to the principle of total internal reflection (TIR), wherein a spectrometer with a slit-shaped stop running along a first direction for cutting out a slit-shaped region of the light reflected by the finger disposed on the contact face, brings about spectral spread in a second direction which differs from the first direction and, with a second camera sensor, records a multiplicity of spectra corresponding to a multiplicity of successive pixels, to which spatial data is assigned along the first direction of the stop, cutting out, in the recorded fingerprint image of the first camera sensor, a region corresponding to the region defined by the stop of the spectrometer, identifying epidermal ridges and troughs situated therebetween in this region, and determining the spatial data thereof along the first direction of the stop, wherein the spatial data relating to the ridges and troughs in the fingerprint image is used to combine those spectra from the multiplicity of spectra which, according to the spatial data thereof, are situated in ridges determined in the fingerprint image so as to form a ridge spectrum and to combine the spectra from the multiplicity of spectra which, according to the spatial data thereof, are situated in the troughs so as to form a trough spectrum, the ridge spectrum and the trough spectrum are normalized to the same overall intensity and these are subtracted from one another in order to form a difference spectrum, and examining the difference spectrum for features indicating the presence of covering materials foreign to the body and rejecting the authenticity if these are present.

2. The method of claim 1, wherein the difference spectrum is examined for the presence of spectroscopic features which are characteristic for C—H—, O—H— and N—H-groups.

3. The method of claim 2, wherein the finger disposed on the contact face is illuminated in the visible VIS range between 500 nm and 850 nm and a multiplicity of spectra are recorded in this wavelength range.

4. The method of claim 2, wherein the finger disposed on the contact face is illuminated in the near infrared ("NIR") range between 800 nm and 1000 nm and a multiplicity of spectra are recorded in this wavelength range.

5. The method of claim 1, wherein the finger disposed on the contact face is illuminated in the visible ("VIS") range between 500 nm and 850 nm and a multiplicity of spectra are recorded in this wavelength range.

6. The method of claim 5, wherein the spectra from the VIS range are examined for the presence of predetermined dyes and, should these be identified, the authenticity of the fingerprint is rejected.

7. The method of claim 6, wherein the spectra from the VIS range are examined for the presence of hemoglobin and the degree of oxygenation thereof is examined in respect of predetermined criteria and, if these are not satisfied, the authenticity of the fingerprint is rejected.

8. The method of claim 6, wherein epidermal ridges and troughs are identified in the multiplicity of spectra and the spatial data thereof is determined along the first direction of the stop, after which the spatial data is used to compare the pattern of epidermal ridges and troughs from the fingerprint image to the pattern of epidermal ridges and troughs along the first direction of the stop and a measure for the correspondence thereof is determined and the authenticity of the fingerprint is rejected if the degree of correspondence lies below a predetermined value.

9. The method of claim 5, wherein the spectra from the VIS range are examined for the presence of hemoglobin and the degree of oxygenation thereof is examined in respect of predetermined criteria and, if these are not satisfied, the authenticity of the fingerprint is rejected.

10. The method of claim 9, wherein the spectra are used in the form of their second derivative.

11. The method of claim 1, wherein the finger disposed on the contact face is illuminated in the near infrared ("NIR") range between 800 nm and 1000 nm and a multiplicity of spectra are recorded in this wavelength range.

12. The method of claim 11, wherein the spectra from the NIR range are examined in respect of the water and fat contents and the authenticity of the fingerprint is rejected if these are situated outside of predetermined ranges.

13. The method of claim 12, wherein the spectra are used in the form of their second derivative.

14. The method of claim 12, wherein epidermal ridges and troughs are identified in the multiplicity of spectra and the spatial data thereof is determined along the first direction of the stop, after which the spatial data is used to compare the pattern of epidermal ridges and troughs from the fingerprint image to the pattern of epidermal ridges and troughs along the first direction of the stop and a measure for the correspondence thereof is determined and the authenticity of the fingerprint is rejected if the degree of correspondence lies below a predetermined value.

15. The method of claim 1, wherein the spectra are used in the form of their second derivative.

16. The method of claim 1, wherein epidermal ridges and troughs are identified in the multiplicity of spectra and the spatial data thereof is determined along the first direction of the stop, after which the spatial data is used to compare the pattern of epidermal ridges and troughs from the fingerprint image to the pattern of epidermal ridges and troughs along the first direction of the stop and a measure for the correspondence thereof is determined and the authenticity of the fingerprint is rejected if the degree of correspondence lies below a predetermined value.

17. A device for recording a fingerprint, with authenticity identification, comprising:
  a fingerprint recording device, which is connected to a data processing instrument and has a prism body with a contact face;
  an illumination unit for illuminating a finger disposed on the contact face and a first camera sensor, which are configured and arranged such that the camera sensor can record a fingerprint image either according to the principle of frustrated total internal reflection (FTIR) or according to the principle of total internal reflection (TIR); and
  a spectrometer with a slit-shaped stop running along a first direction for cutting out a slit-shaped region of the light reflected by the finger disposed on the contact face is present, wherein the spectrometer is designed to bring about spectral spread in a second direction which differs from the first direction and, with a second camera sensor, record a multiplicity of spectra corresponding to a multiplicity of successive pixels along the first direction of the stop, wherein the data processing instrument is designed to assign spatial data along the first direction of the stop to each of the multiplicity of spectra,
  wherein the data processing instrument is designed to cut out, in the recorded fingerprint image of the first camera sensor, a region corresponding to the region defined by the stop of the spectrometer and identify epidermal ridges and troughs situated therebetween in this region and determine the spatial data thereof along the first direction of the stop,
  wherein the data processing instrument is further designed, using the spatial data relating to the ridges and troughs in the fingerprint image, to combine those spectra from the multiplicity of spectra which, according to the spatial data thereof, are situated in the region of ridges determined in the fingerprint image so as to form a ridge spectrum and to combine the spectra from the multiplicity of spectra which, according to the spatial data thereof, are situated in the region of the troughs determined in the fingerprint image so as to form a trough spectrum, to normalize the ridge spectrum and the trough spectrum to the same overall intensity and to subtract these from one another in order to form a difference spectrum, and
  wherein the data processing instrument is further designed to examine the difference spectrum for features indicating the presence of covering materials foreign to the body.

18. The device of claim 17, wherein the illumination unit for radiating light through the prism body from below and onto the finger disposed on the contact face is present, wherein the spectrometer with the stop thereof records light which was reflected downward from the finger and substantially perpendicularly to the contact face, and wherein the spectrometer has a blazed grating, which is configured and arranged such that the dispersive spread of the light passing through the stop takes place in a direction that differs from the longitudinal direction of the stop, wherein the second camera sensor is configured and arranged such that it records on its camera sensor surface a diffraction image of the grating along the first direction of the stop and the dispersive spectral spread of the light in a second direction that differs from the first, wherein the second camera sensor is connected to the data processing instrument, which is furthermore designed to record the signals received by the second camera sensor as a multiplicity of spectra corresponding to a multiplicity of pixels along the longitudinal direction of the stop and to respectively assign these spatial data in the first direction along the stop.

19. The device of claim 18, wherein the stop of the spectrometer is arranged below the prism body on the side thereof lying opposite to the contact face and the illumination unit, for the purposes of recording the spectra, radiates light into the prism body from below, substantially perpendicularly to the contact face, and the stop cuts out light in a strip-shaped region reflected substantially vertically downward from the resting finger, which strip-shaped region runs in the longitudinal direction of the finger when the resting finger is disposed in the placement position provided.

20. The device of claim 17, wherein the stop of the spectrometer is arranged below the prism body on the side thereof lying opposite to the contact face and the illumination unit, for the purposes of recording the spectra, radiates light into the prism body from below, substantially perpendicularly to the contact face, and the stop cuts out light in a strip-shaped region reflected substantially vertically downward from the resting finger, which strip-shaped region runs in the longitudinal direction of the finger when the resting finger is disposed in the placement position provided.

\* \* \* \* \*